United States Patent
Kojo et al.

(10) Patent No.: US 9,046,364 B2
(45) Date of Patent: Jun. 2, 2015

(54) DISTANCE MEASUREMENT DEVICE AND ENVIRONMENT MAP GENERATION APPARATUS

(75) Inventors: Naoki Kojo, Inagi (JP); Seigo Watanabe, Yokohama (JP); Toshiyuki Andou, Yokohama (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 127 days.

(21) Appl. No.: 13/822,607

(22) PCT Filed: Apr. 24, 2012

(86) PCT No.: PCT/JP2012/060984
§ 371 (c)(1),
(2), (4) Date: Mar. 12, 2013

(87) PCT Pub. No.: WO2012/172870
PCT Pub. Date: Dec. 20, 2012

(65) Prior Publication Data
US 2013/0182906 A1    Jul. 18, 2013

(30) Foreign Application Priority Data

Jun. 14, 2011  (JP) .................................. 2011-131888

(51) Int. Cl.
| | | |
|---|---|---|
| *G06K 9/00* | (2006.01) | |
| *G01C 11/06* | (2006.01) | |
| *G01S 11/12* | (2006.01) | |
| *G06T 7/00* | (2006.01) | |

(52) U.S. Cl.
CPC .............. *G01C 11/06* (2013.01); *G01S 11/12* (2013.01); *G06T 7/0057* (2013.01); *G06T 7/0071* (2013.01); *G06T 2207/30252* (2013.01)

(58) Field of Classification Search
None
See application file for complete search history.

(56) References Cited

U.S. PATENT DOCUMENTS

| 6,650,403 B2 * | 11/2003 | Ogawa et al. ................ 356/5.01 |
| 2003/0058242 A1 * | 3/2003 | Redlich ......................... 345/427 |

(Continued)

FOREIGN PATENT DOCUMENTS

| EP | 1990772 A2 * | 11/2008 |
| JP | 60-7318 A | 1/1985 |

(Continued)

OTHER PUBLICATIONS

R. Aufrere, J. Gowdy, C. Mertz, C. Thorpe, C. Wang, and T. Yata, Perception for collision avoidance and autonomous driving, Mechatronics, vol. 13(10): 1149-1161, 2003.*

(Continued)

*Primary Examiner* — Shefali Goradia
*Assistant Examiner* — Ian Lemieux
(74) *Attorney, Agent, or Firm* — Foley & Lardner LLP

(57) ABSTRACT

Based on an image imaged by an imaging unit (2), feature points of a plurality of objects present around a vehicle are detected by a feature point detecting unit (35). A first distance from the feature point to the imaging unit (2) is calculated based on a temporal change of the feature point. A second distance from a certain object included in the plurality of objects present in the image to the imaging unit is calculated using some pixels of the certain object. The first distance of the plurality of feature points, other than the certain feature point, simultaneously detected by the feature point detecting unit (35) is modified based on a ratio of the first distance and the second distance.

7 Claims, 12 Drawing Sheets

○ : FEATURE POINT BEFORE MODIFICATION
● : FEATURE POINT AFTER MODIFICATION

(56) References Cited

U.S. PATENT DOCUMENTS

| | | | |
|---|---|---|---|
| 2006/0215903 A1* | 9/2006 | Nishiyama | 382/154 |
| 2007/0291130 A1* | 12/2007 | Broggi et al. | 348/218.1 |
| 2009/0252377 A1* | 10/2009 | Akita et al. | 382/106 |
| 2010/0118123 A1 | 5/2010 | Freedman et al. | |
| 2010/0286905 A1* | 11/2010 | Goncalves et al. | 701/200 |
| 2011/0123135 A1* | 5/2011 | Hsieh et al. | 382/285 |

FOREIGN PATENT DOCUMENTS

| | | |
|---|---|---|
| JP | 10-339615 A | 12/1998 |
| JP | 2004-028727 A | 1/2004 |
| JP | 2006-072873 A | 3/2006 |
| JP | 2006-285946 A | 10/2006 |
| JP | 2007-263657 A | 10/2007 |
| JP | 2010-008352 A | 1/2010 |

OTHER PUBLICATIONS

T. Kanade, O. Amidi, Q. Ke, Real-time and 3d vision for autonomous small and micro air vehicles, in: Proceedings of the 43th IEEE Conference on Decision and Control, CDC, 2004.*

Wang, Han, and M. Brady. "A structure-from-motion algorithm for robot vehicle guidance." Intelligent Vehicles' 92 Symposium., Proceedings of the. IEEE, 1992.*

R. Hartley and A. Zisserman "Multiple View Geometry", Cambridge University press.

G. Klein and D. Murray "Parallel Tracking and Mapping for Small AR Workspaces", ISMAR 2007.

* cited by examiner

○ : FEATURE POINT BEFORE MODIFICATION
● : FEATURE POINT AFTER MODIFICATION

DISTANCE MEASUREMENT DEVICE AND ENVIRONMENT MAP GENERATION APPARATUS

TECHNICAL FIELD

The present invention relates to a distance measurement device that images a surrounding object around a vehicle traveling road through a camera mounted in a vehicle and measures the distance to the surrounding object using the imaged image and an environment map generation apparatus that acquires a three-dimensional (3D) image of a surrounding object using the distance measurement device and generates an environment map.

BACKGROUND ART

In the past, as a technique of converting a feature point obtained by a monocular camera into 3D data and modifying a feature point distance, for example, a 3D coordinate acquiring device disclosed in JP-A 2007-263657 (Patent Document 1) has been known. Patent Document 1 discloses a 3D coordinate acquiring device including two cameras that are installed with a predetermined distance therebetween, a monocular stereo processing unit that acquires 3D coordinates of a surrounding target using one of the two cameras, and a multiocular stereo processing unit that acquires 3D coordinates of a surrounding target using images simultaneously imaged by the two cameras, in which 3D coordinates of the surrounding target are calculated by selecting or integrating the 3D coordinates respectively calculated by the processing units.

CITATION LIST

Patent Document

[Patent Document 1]: Japanese Patent Application Publication No 2007-263657

SUMMARY OF INVENTION

However, in the method discussed in Patent Document 1, only feature points simultaneously calculated by the monocular stereo processing and the multiocular stereo processing are modified, and the entire environment map is not modified.

The present invention is made to solve the problems of the related art, and it is an object of the present invention to provide a distance measurement device capable of measuring the distance to a surrounding object with a high degree of accuracy and an environment map generation apparatus capable of improving the scale accuracy of a high-accuracy environment map as a whole.

In order to achieve the above object, a distance measurement device or an environment map generation apparatus according to an embodiment of the present invention includes a feature point detecting unit that detects feature points of a plurality of objects present around a vehicle from an image around the vehicle imaged while the vehicle is moving, a first distance calculating unit that calculates a first distance from the feature point to an imaging unit based on a temporal change of the detected feature point, a second distance calculating unit that calculates a second distance from a certain object included in the plurality of objects present in the image to the imaging unit using some pixels of the certain object, and a scale modifying unit that extracts a certain feature point substantially matching some pixels of the certain object from among feature points of the plurality of objects, calculates a ratio of the first distance and the second distance in the certain feature point, and modifies the first distance of the plurality of feature points, other than the certain feature point, simultaneously detected by the feature point detecting unit based on the ratio.

DESCRIPTION OF EMBODIMENTS

Hereinafter, embodiments of the present invention will be described with reference to the drawings.

[Description of First Embodiment]

Figure 1:
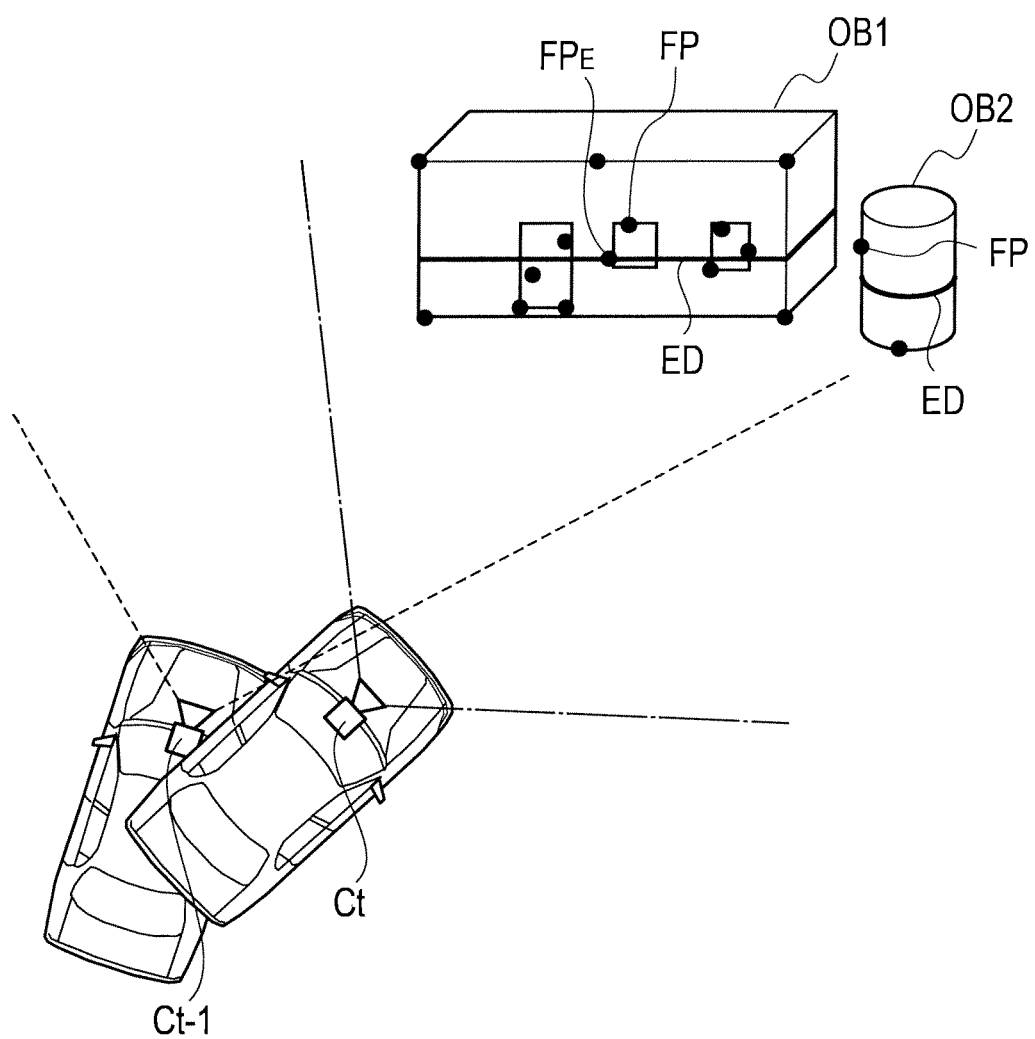
FIG. 1 is a schematic diagram illustrating a relation between feature points FP and $FP_E$ and edge portions ED present in surrounding targets OB1 and OB2 serving as a detection target.
Figure 2:
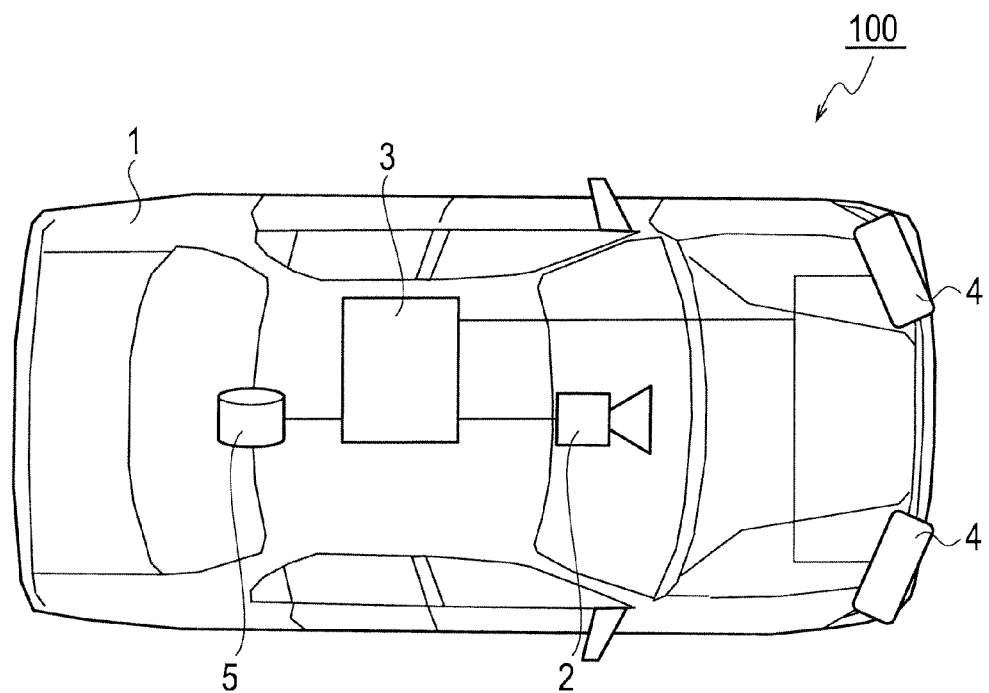
FIG. 2 is a schematic diagram illustrating an aspect in which an environment map generation apparatus 100 according to a first embodiment of the present invention is mounted in a vehicle.
Figure 3:
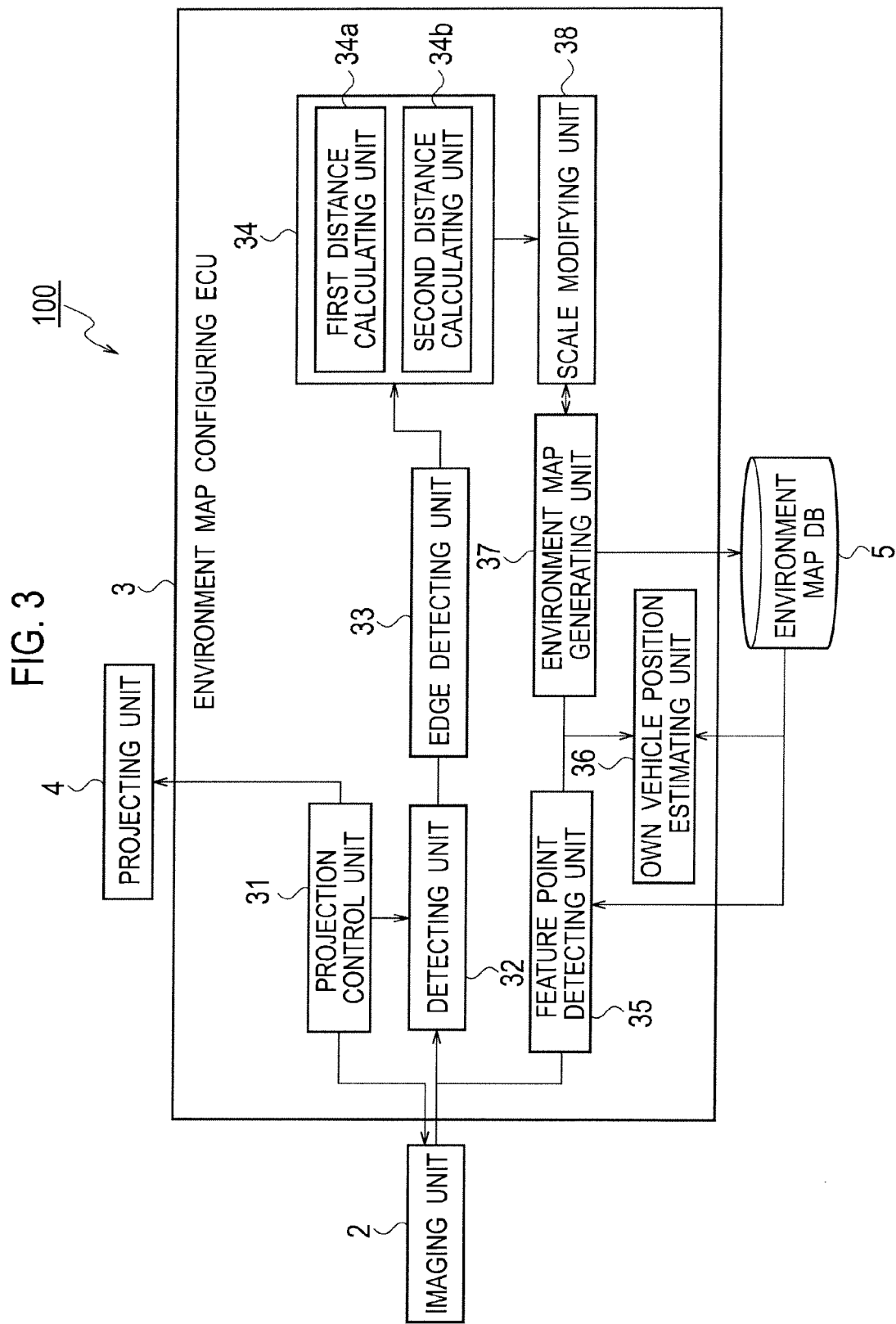
FIG. 3 is a block diagram illustrating a configuration of the environment map generation apparatus 100 according to the first embodiment of the present invention.

FIG. 1 is a schematic diagram illustrating a relation between feature points FP and $FP_E$ and edge portions ED present in surrounding targets OB1 and OB2 serving as a detection target. FIG. 2 is a schematic diagram illustrating an aspect in which an environment map generation apparatus 100 is mounted in a vehicle. FIG. 3 is a block diagram illustrating a configuration of an environment map generation apparatus according to a first embodiment.

As illustrated in FIGS. 1 to 3, the environment map generation apparatus 100 according to the present embodiment is mounted in a vehicle 1 and acquires 3D information of the surrounding targets OB1 and OB2 to generate an environment map, and includes an imaging unit 2, an environment map configuring ECU 3, a projecting unit 4, and an environment map database 5.

The imaging unit 2 is a camera using a solid state imaging device such as a charge coupled device (CCD) type or the like and installed at the back side of a rearview mirror in the vehicle 1 to image an object in front of a vehicle, for example. The imaging unit 2 acquires a general image, and receives reflected light in which light irradiated from the projecting unit 4 is reflected from a measurement target object. Then, the imaging unit 2 outputs the imaged image to the environment map configuring ECU 3.

The environment map configuring ECU 3 is an electronic control unit (ECU) that includes a projection control unit 31, a detecting unit 32, an edge detecting unit 33, a distance calculating unit 34, a feature point detecting unit 35, an own vehicle position estimating unit 36, an environment map generating unit 37, and a scale modifying unit 38. The environment map configuring ECU 3 performs various processes which will be described below such as an environment map generating process using an image. The environment map configuring ECU 3 may double as an ECU used for other control. The environment map configuring ECU 3 further includes a central processing unit (CPU), a read only memory (ROM), a random access memory (RAM), and the like, similarly to a general ECU, and the ROM stores a program for implementing various kinds of processing means which will be described below.

The projecting unit 4 is, for example, a projector headlight or a headlight including a reflector, and has a light distribution characteristic in which a light-emitting region is formed in the horizontal direction. The emitted light formed in the horizontal direction is irradiated to a measurement target object, and implements light distribution in which a brightness boundary between an irradiated region and a non-irradiated region is vividly projected onto the measurement target object. In other words, the projecting unit 4 has a function of projecting pulsed light of temporal modulation having the light-emitting region in horizontal direction.

The environment map database 5 is a storage means that stores environment map information generated by the environment map generating unit 37 together with the image imaged by the imaging unit 2 and additional information such as an own vehicle position acquired by the own vehicle position estimating unit 36, and can be implemented using a storage medium such as a hard disk or a memory card, for example.

The projection control unit 31 disposed in the environment map configuring ECU 3 controls the length of a lighting-on time and the length of a lighting-off time when the projecting unit 4 performs pulse lighting according to PWM control or the like. For example, the projection pattern by the projecting unit 4 is a projection pattern in which the light-emitting region is formed in the horizontal direction and projection light is irradiated to an area therebelow. Further, the projection control unit 31 outputs an imaging timing signal to the imaging unit 2. In addition, the projection control unit 31 applies a carrier wave (a carrier frequency) used in a detection process for extracting pulsed light from an image imaged in synchronization with pulsed light irradiated from the projecting unit 4 to the detecting unit 32.

The detecting unit 32 extracts only light synchronized with the pulsed light irradiated by the projecting unit 4 in all pixels of an image or in all pixels of an image processing region when a processing region is limited in an image using an image obtained in time series by the imaging unit 2. Preferably, a commonly used well-known synchronous detection technique is used in a process of robustly detecting only irradiation light. In the present embodiment, irradiation light is extracted from each pixel by executing the synchronous detection process on all pixels of an image imaged by the imaging unit 2 or all pixels of an image region set as a processing region. For example, a binary phase shift keying (BPSK) may be used as a phase shift keying scheme.

The edge detecting unit 33 detects the upper end edge portion ED of irradiation light from the irradiation light image extracted by the detecting unit 32. In other words, as illustrated in FIG. 1, pulsed light is irradiated toward the surrounding targets OB1 and OB2, and the edge portion ED serving as the upper end of the irradiation light is detected from the image imaged by the imaging unit 2.

The distance calculating unit 34 includes a first distance calculating unit 34a and a second distance calculating unit 34b. The second distance calculating unit 34b calculates a distance (which is referred to as a "second distance") on each pixel on the edge portion ED detected and specified by the edge detecting unit 33 based on an irradiation direction of the upper end edge portion ED of the irradiation light, an angle formed by a visual axis of the imaging unit 2, and the layout using the principle of triangulation. Preferably, a technique generally called the optical-cutting technique is used as a calculating technique. Further, the first distance calculating unit 34a calculates a distance (which is referred to as a "first distance") of the own vehicle position estimated by the own vehicle position estimating unit 36 from the installation position of the imaging unit 2 to a plurality of feature points.

Instead of the above-described technique, a well-known technique may be used as a concrete control technique of the projecting unit 4, the projection control unit 31, the detecting unit 32, the edge detecting unit 33, and the distance calculating unit 34 which have been described so far.

The feature point detecting unit 35 detects a feature point in a screen on the image imaged by the imaging unit 2 or a previous image accumulated in the environment map database 5. Here, the feature point is a point which can be tracked when a screen moves, and generally refers to a point having a brightness difference in both a vertical direction and a horizontal direction. Various techniques (for example, a SIFT, a SURF, or a fast) have been proposed as a robust feature point detecting technique, and various kinds of techniques may be used as the detecting technique.

The own vehicle position estimating unit 36 estimates an own vehicle position and posture based on information such as the image imaged by the imaging unit 2, an image and a feature point accumulated in the environment map database 5, and the installation position of the imaging unit 2 (camera) on the vehicle. Specifically, first, prior estimation of the own vehicle position is executed using prior knowledge (an own vehicle position estimation result, an odometry signal, a vehicle speed, an acceleration information, or the like in a previous time step). When the position and posture are obtained by the prior estimation, a feature point which can appear in the image imaged by the imaging unit 2 is selected from among feature points accumulated in the environment map database 5 using the position and posture, the position in the image is estimated, and the feature point is searched in the image based on the estimation value of the intra-image position.

As a result, a deviation between the intra-image position estimated from the prior estimation value and the actually detected intra-image position is detected. Thereafter, the own vehicle position is calculated based on the deviation between the intra-image feature point position and the feature point position calculated based on the prior estimation value of the own vehicle position. This is hereinafter referred to as a "posterior estimation." Here, a final own vehicle position estimation result is acquired by executing the posterior estimation of adjusting the prior position estimation result so that the position of the feature point matches the actual measured position.

The environment map generating unit 37 compares the feature point on the image imaged by the imaging unit 2 with the feature point on the previous image which is accumulated in the environment map database 5 and overlaps the imaged region, and calculates 3D coordinates of the feature point by a well-known technique (for example, a technique discussed in R. Hartley and A. Zisserman "Multiple View Geometry", Cambridge University press). The calculated 3D coordinates of the feature point is output to the scale modifying unit 38. The scale modifying unit 38 acquires modified 3D coordinates whose scale is modified by the scale modifying unit 38.

The scale-modified 3D coordinates of the feature point are transformed into world coordinates based on the own vehicle position and posture obtained by the own vehicle position estimating unit 36, and data of the world coordinates is transferred to be stored in the environment map database 5. At this time, the own vehicle position and posture and the image are simultaneously stored in association with each other.

As described above, in order to transform the feature point which has been subjected to 3D conversion by the coordinate system of the imaging unit 2 into the world coordinates, it is necessary to simultaneously obtain the position of the imaging unit 2 in the world coordinates and 3D organization of the feature point. As described above, as a technique of simultaneously performing map generation and own vehicle position estimation, an SLAM has been proposed, and various algorithms on the SLAM have been published. Examples of an SLAM using a camera include a Mono-SLAM and a PTAM.

The scale modifying unit 38 performs scale transform on the 3D coordinates of the feature point which has been subjected to 3D conversion by the environment map generating unit 37 using the distance information of the pixel calculated by the distance calculating unit 34. The details process procedure will be described below.

Next, an environment map generating procedure by the environment map generation apparatus 100 according to the first embodiment will be described with reference to a flowchart of FIG. 4. Steps S3 to S5 and steps S6 to S10 of FIG. 4 may be simultaneously executed using a thread process, or step S6 may be executed after step S5. Further, an asynchronous technique in which steps S1 to S5 are executed at a fast period and steps S6 to S13 are executed at a late period may be used.

Figure 4:
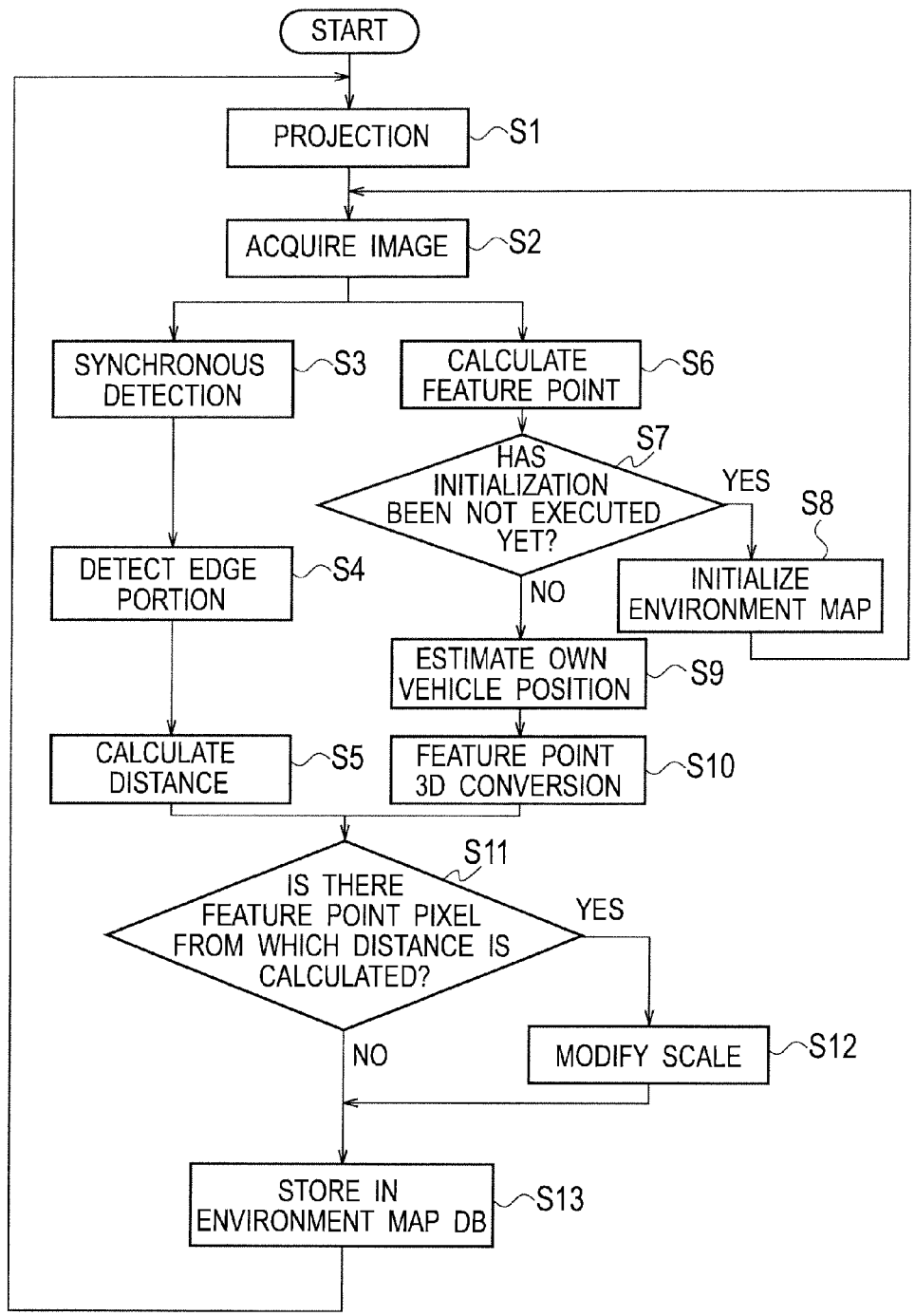
FIG. 4 is a flowchart illustrating a procedure of an environment map generating process of the environment map generation apparatus 100 according to the first embodiment of the present invention.

First, in step S1 illustrated in FIG. 4, an imaging timing signal is transmitted to the imaging unit 2 based on a command from the projection control unit 31 at the same time when the projecting unit 4 is pulse-lighted up. Thereafter, the process proceeds to step S2.

In step S2, an image imaged by the imaging unit 2 is acquired based on the imaging timing signal transmitted in step S1. Thereafter, the process proceeds to step S3 and step S6.

In step S3, the detecting unit 32 extracts only light synchronized with the pulsed light irradiated from the projecting unit 4 based on the image acquired in step S2 and a carrier wave (a carrier frequency) transmitted from the projecting unit 4. Thereafter, the process proceeds to step S4.

In step S4, the edge detecting unit 33 detects the upper end edge portion ED of the irradiation light from the irradiation light image extracted by the detecting unit 32. Thereafter, the process proceeds to step S5.

In step S5, the second distance calculating unit 34b of the distance calculating unit 34 calculates the distance on each pixel on the edge portion ED detected and specified by the edge detecting unit 33, and the calculated distance is used as the second distance. Thereafter, the process proceeds to step S11. Further, when the distance detecting process of steps S1 to S5 based on the synchronous detection is performed at a high frequency of update in asynchronization with step S6 and subsequent steps, calculation data may be stored in a memory after step S5, and then the process may proceed to step S6.

In step S6, an image used to calculate the second distance in step S5 is selected from among images imaged by the imaging unit 2, and the feature point is detected using the feature point detecting unit 35. Thereafter, the process proceeds to step S7.

In step S7, it is determined whether or not an initialization process has been already completed in the environment map database 5. When it is determined that the initialization process has not been already completed (Yes in step S7), the process proceeds to step S8, whereas when it is determined that the initialization process has been already completed (No in step S7), the process proceeds to step S9.

In step S8, the environment map initialization process is performed. In this process, first, the feature point information calculated in step S6 is stored in the memory, and then the process returns to step S2. Then, an image is acquired again from the imaging unit 2, and tracking of the feature point is performed such that a feature point is similarly calculated and compared with the already acquired feature point. Preferably, a commonly well-known image processing technique such as a KLT Tracker is applied as the feature point tracking technique. The feature point tracking is subsequently performed. A feature point of an initial image is compared with a feature point of a current image at a point in time at which the vehicle moves forward by a certain distance, for example, 0.5 m. 3D conversion of the feature point is performed using a commonly known technique such as an 8-point method. An initial own vehicle position and posture of the vehicle are specified using a relative relation with the feature point. Then the environment map initialization process ends.

Since this process uses a plurality of images which are consecutively imaged, the process of step S9 and subsequent steps are not executed during this process.

In step S9, the own vehicle position estimating unit 36 estimates the own vehicle position and posture based on a relative relation between the feature point calculated in step S6 and a group of 3D feature points accumulated in the environment map database 5. Thereafter, the process proceeds to step S10.

In step S10, a previous image overlapping the imaged region is acquired from the environment map database 5 based on the own vehicle position and posture information acquired in step S9. The feature point in the previous image is compared with the feature point acquired in the process of step S6. The environment map generating unit 37 acquires a group of 3D feature points using a group of a plurality of matched feature points. The distance from the installation position of the imaging unit 2 to each feature point is calculated. The calculated distance is used as the first distance. The first distance is calculated by the first distance calculating unit 34a of the distance calculating unit 34 illustrated in FIG. 1. Thereafter, the process proceeds to step S11.

In step S11, it is determined whether or not there is a feature point (certain feature point), from which the second distance is calculated, by use of comparing the pixel position of the 3D feature point group obtained by the process of step S10 in the current image with the pixel position present on the edge portion ED from which the second distance is calculated in the process of step S5. When it is determined that there is a feature point (certain feature point) from which the second distance is calculated (YES in step S11), the process proceeds to step S12, but when it is determined that there is no feature point (certain feature point) from which the second distance is calculated (NO in step S11), the process proceeds to step S13.

In step S12, scale modification is performed on all feature points calculated at the same time as the own vehicle position based on the distance information of the feature point. Thereafter, the process proceeds to step S13.

In step S13, the feature point group which is obtained in the process of step S11 or modified in the process of step S12 and the own vehicle position and posture are transformed into the world coordinates, and then stored in the environment map database 5 together with the image. Thereafter, the process returns to step S1.

Figure 5:
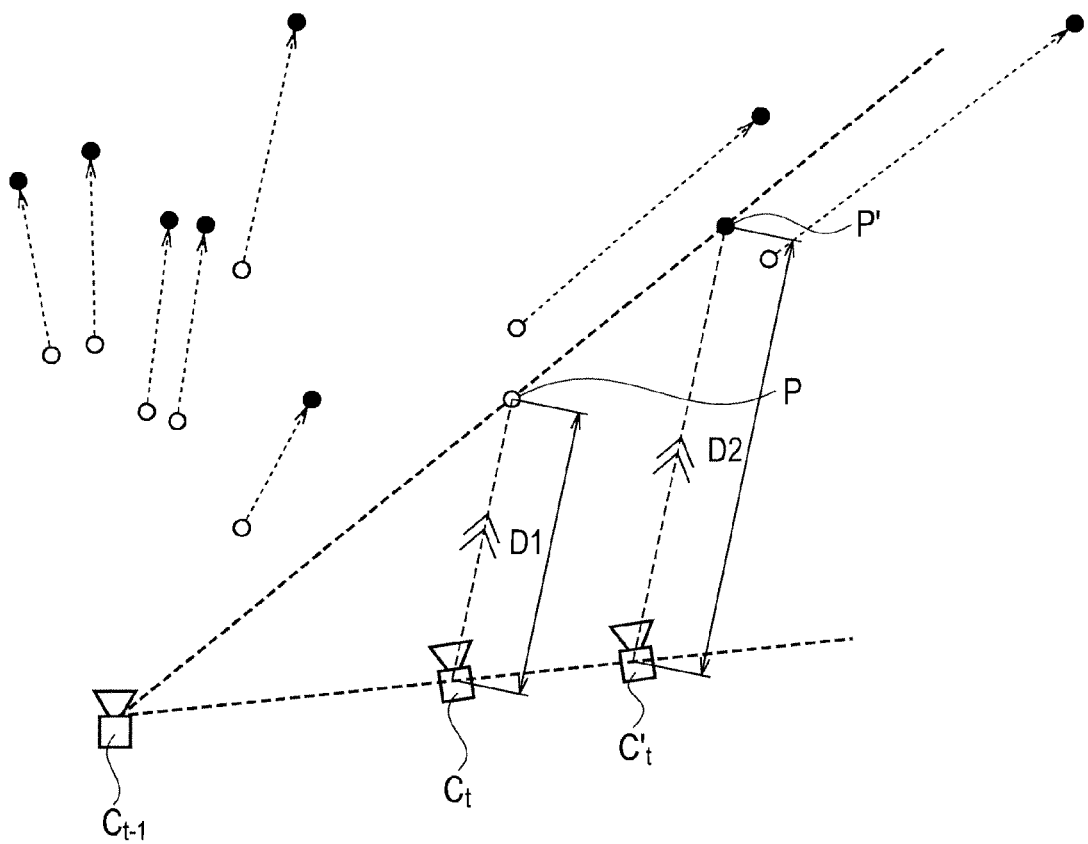
FIG. 5 is an explanatory diagram when scale modification is executed by the environment map generation apparatus 100 according to the first embodiment of the present invention.

Next, a concrete technique will be described with reference to FIG. 5. In FIG. 5, the distance is assumed to be detected from one feature point (that is, the image position of the feature point is assumed to match the distance calculation image position calculated by the distance calculating unit 34 at one point). In FIGS. 5 and 1, a symbol Ct represents a current imaging position and posture estimated in the process of step S9, and a symbol Ct-1 represents an imaging position and posture when the image selected for 3D conversion of the feature point in the process of step S10 is imaged. A symbol P represents a feature point (certain feature point) from which the distance is detected. In other words, at the feature point P, the image position matches the distance calculation image position calculated by the distance calculating unit 34.

First, a distance D1 (the first distance) from the camera position Ct to the feature point P is calculated using the coordinate position of the feature point group which has been subjected to 3D conversion in the process of step S10. Next, the distance at the feature point pixel position calculated in the process of step S5 is represented by D2 (the second distance), and a scale ratio R is calculated by R=D2/D1.

Next, the camera position Ct, the feature point P, and all other feature points are enlarged or reduced centering on the camera position Ct-1 based on the scale ratio R. In the example illustrated in FIG. 5, a camera position C't and a feature point P' represent positions obtained by performing scale transformation on the camera position Ct and the feature point P. A triangle having Ct-1, Ct, and P as apexes is similar to a triangle having Ct-1, C't, and P' as apexes, and a similarity ratio is 1:R (=D1:D2). The distance between the camera position C't and the feature point P' after scale transform matches the distance D2.

Further, other feature points are also enlarged or reduced centering on the camera position Ct-1 based on the scale ratio R. For example, the feature point P is scale-modified to have the position of the feature point P'. A white circle in FIG. 5 represents a feature point before modification, and a black circle represents a feature point after modification.

The above description has been made in connection with the example in which the second distance is detected from one feature point (certain feature point), but there are actually many cases in which the second distance is calculated on a plurality of feature points. Next, a scale ratio calculating procedure in which the second distance is calculated from N feature points P1, P2, . . . , and Pn will be described. First, scale ratios R1, R2, . . . , and Rn are calculated on the N feature points P1 to Pn, respectively, in the above-described way. Next, feature point intensities f1, f2, . . . , and fn at the time of detection of the feature point are defined and calculated such that a number increases as intensity of a feature increases. For example, in a FAST which is a feature point detection technique using a difference in a brightness value, it is preferable to perform scoring using an average value of brightness differences between a center pixel and neighboring comparative pixels. Here, the sum of f1 to fn is represented by fs. Preferably, a representative value R of the scale ratio is calculated by R=(R1×f1+R2×f2+ . . . +Rn×fn)/fs using the calculated feature point intensity, and scale modification is performed using the representative value R (weighted average value) of the scale ratio.

As a method of calculating the representative value R of the scale ratio, a simple average value may be used instead of the weighted average value, and the scale ratio R of the feature point having the highest intensity may be used. The scale of the feature point in which the distance from the camera (the imaging unit 2) is known may be modified at each scale ratio, and the own vehicle position and another feature point group may be modified using the representative value R of the scale ratio.

Thus, in the environment map generation apparatus 100 according to the first embodiment of the present invention, when stereo processing is performed using a monocular camera, since absolute distance information obtained by a synchronous detection technique can be used, a map representing a 3D position of a surrounding target can fit an actual size. Further, since the own vehicle position is modified together in the course of the calculation process, the own vehicle position estimation accuracy can be improved.

Further, when there are a plurality of feature points (certain feature points) from which the second distance is calculated, since the scale modification process is performed by weighting according to the intensity of each feature point, influence of the feature point having low reliability is reduced, and thus scale modification in which a mismatch is avoided and accumulation of an error is prevented can be performed.

In addition, when the monocular camera used for stereo processing is the same as the camera performing synchronous detection and a head lamp installed in the vehicle 1 is used as the projecting unit 4 that projects pulsed light, the cost can be reduced compared to when distance detection is performed using the stereocamera.

[Description of Second Embodiment]

Figure 6:
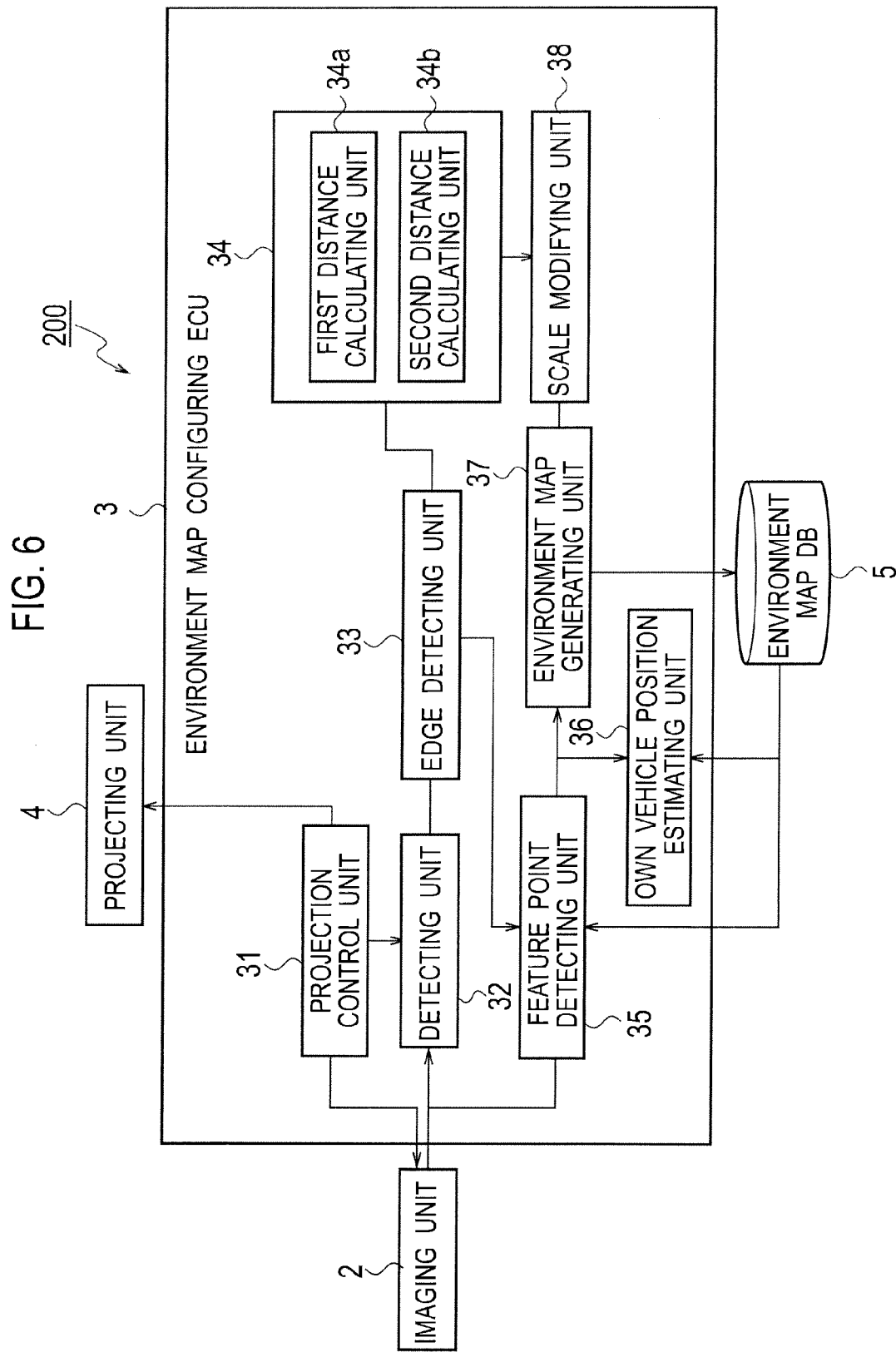
FIG. 6 is a block diagram illustrating a configuration of an environment map generation apparatus 200 according to a second embodiment of the present invention.

Next, a second embodiment of the present invention will be described. FIG. 6 is a block diagram illustrating a configuration of an environment map generation apparatus 200 according to the second embodiment. FIG. 6 differs from FIG. 3 described in the first embodiment in that a detection signal by the edge detecting unit 33 is output to the feature point detecting unit 35, and the remaining components are the same as in FIG. 3. Thus, the same components are denoted by the same reference numerals, and a description thereof will not be made.

The feature point detecting unit 35 illustrated in FIG. 6 detects a feature point in a screen on the image of the imaging unit 2 or the previous image accumulated in the environment map database 5. Further, the feature point detecting unit 35 changes a feature point detection criteria (feature point detection threshold value) for each region using the pixel information of the edge portion ED obtained by the edge detecting unit 33. Generally, the feature point detection technique employs a threshold value, and when a high threshold value is set, the number of detected feature points decreases, whereas when a low threshold value is set, the number of detected feature points increases.

Figure 7:
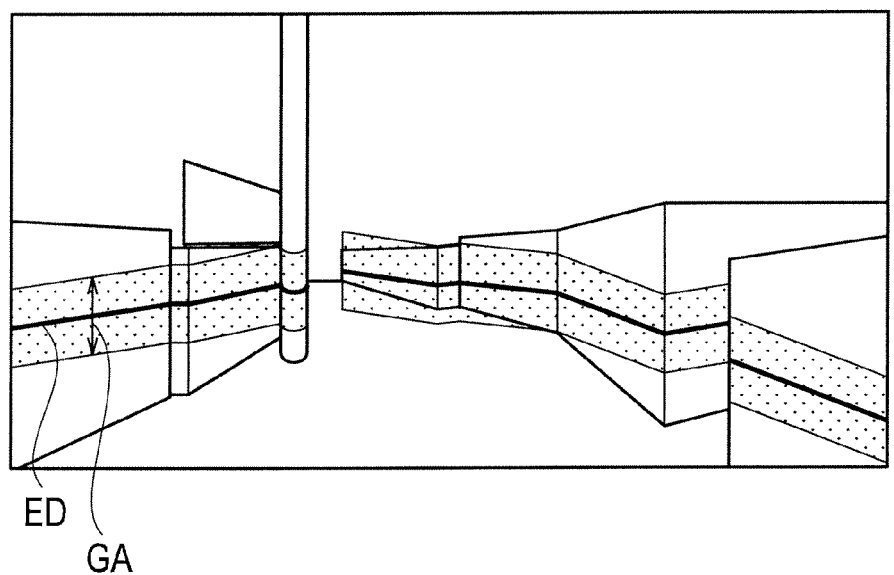
FIG. 7 is an explanatory diagram schematically illustrating a feature point detecting process of the environment map generation apparatus 200 according to the second embodiment of the present invention.

A change area of the feature point detection criteria will be described with reference to an explanatory diagram illustrated in FIG. 7. When imaging is performed by projecting pulsed light having an edge line in the horizontal direction by the head lamp mounted in the vehicle, a detection area of the edge portion ED generally swings on an imaging pixel in the vertical direction according to a pitch angle change of the vehicle. In this regard, as illustrated in FIG. 7, a predetermined area GA below and above the pixel of the detection edge portion ED calculated by the edge detecting unit 33 is set as the change area of the feature point detection criteria, and in this area, a detection threshold value of a feature point is set to a low value so that a feature point is easily detected.

Preferably, a change area width of the detection threshold value is arbitrarily set in view of an actual pitch angle change value of a vehicle, a processing speed request value, or the like. Further, in the pixel on the detection edge portion ED, the detection threshold value may be set to a low value.

In a process procedure of the environment map generation apparatus 200 according to the second embodiment, the process of steps S3 to S5 illustrated in FIG. 4 described in the first embodiment is executed before step S6. The remaining process is similar to the process illustrated in FIG. 4, and thus a description thereof will not be made.

As described above, the environment map generation apparatus 200 according to the second embodiment can arbitrarily increase the feature point density around the edge portion ED calculated by the edge detecting unit 33. In other words, in the area near the edge portion ED illustrated in FIG. 7, the detection threshold value of the feature point is set to a low value, and thus the feature point density increases. Thus, a probability in which the second distance of the feature point which has been subjected to 3D conversion is detected can be increased. The accuracy of generating a map representing the 3D position of the surrounding tart can be consequently improved.

Further, as illustrated in FIG. 7, the feature point is acquired concentratedly in the predetermined width GA of the region, in which the distance information is calculated by the synchronous detection technique, in the direction vertical to the edge portion ED. Thus, even when the second distance is not detected at the time of detection of the feature point, it is possible to increase the feature point from which the second distance is likely to be detected with the movement of the vehicle. Then, when the feature point from which the second distance is detected is detected below, it is necessary to calculate the same feature point even from the corresponding previous image. But, since the feature point has been already calculated as the feature point candidate, it is possible to easily detect the corresponding feature point without performing an additional process.

In addition, when an edge line of pulsed light is discontinuous, the second distance is likely to be detected in the direction vertical to the edge portion ED rather than the horizontal direction. Thus, processing is performed in the direction vertical to the edge portion ED other than on the periphery of the edge portion ED, and it is possible to rationally increase the feature point (certain feature point) without unnecessarily increasing the memory capacity and the calculation cost.

[Description of Third Embodiment]

Figure 8:
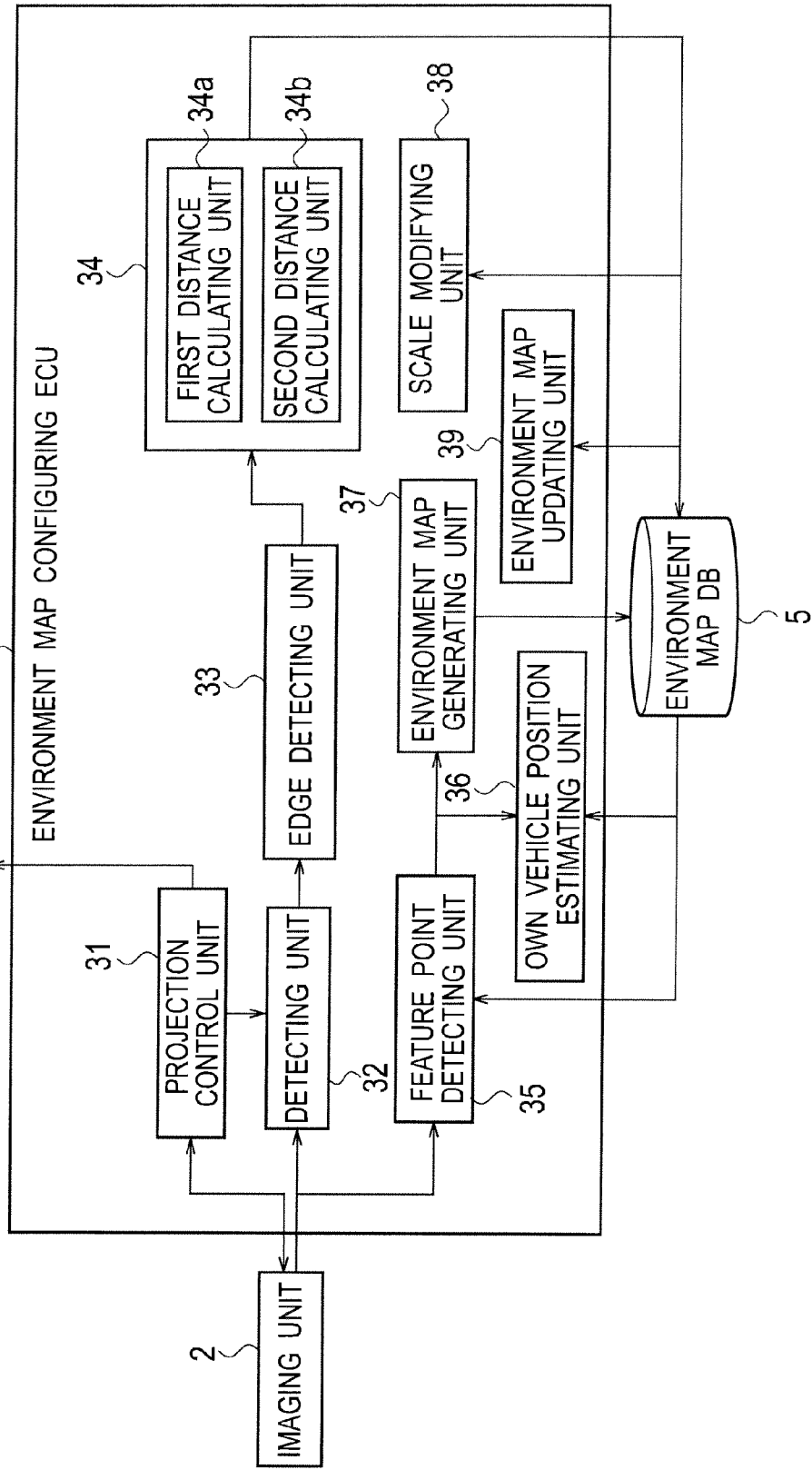
FIG. 8 is a block diagram illustrating a configuration of an environment map generation apparatus 300 according to a third embodiment of the present invention.

Next, a third embodiment of the present invention will be described. FIG. 8 is a block diagram illustrating a configuration of an environment map generation apparatus 300 according to the third embodiment.

FIG. 8 differs from FIG. 3 described in the first embodiment in the process of the distance calculating unit 34 and the scale modifying unit 38 and the fact that an environment map updating unit 39 is added. The remaining components are the same as in FIG. 3. Thus, the same components are denoted by the same reference numerals, and a description thereof will not be made.

The first distance calculating unit 34a and the second distance calculating unit 34b of the distance calculating unit 34 illustrated in FIG. 8 calculate the first distance and the second distance on each pixel on the edge portion detected and specified by the edge detecting unit 33 based on an irradiation direction of the upper end edge portion ED of the irradiation light, an angle formed by a visual axis of the imaging unit 2, and the layout using the principle of triangulation. Preferably, a technique generally called the optical-cutting technique is used as a calculating technique.

Further, in the environment map generation apparatus 300 according to the third embodiment, information of the second distance of the pixel calculated by the distance calculating unit 34 is stored in the environment map database 5 as information associated with the feature point when the position of the pixel matches the position of the feature point detected by the environment map generating unit 37. In other words, the feature point including the information of the second distance is stored in the environment map database 5.

The scale modifying unit 38 acquires the feature point group and the own vehicle position information of a predetermined previous frame (for example, an immediately previous frame) accumulated in the environment map database 5, determines whether or not the feature point including the distance information is present in the corresponding feature point group, and performs the scale modification process on the corresponding feature point group when it is determined that the corresponding feature point is present. As the scale modification process, the technique described in the process of step S12 of FIG. 4 described in the first embodiment may be used.

Further, when the scale modification is performed, the own vehicle position of the predetermined previous frame is modified, and thus it is necessary to correct the own vehicle position and the feature point group calculated after the corresponding previous frame. Specifically, the same coordinate transform as that performed on the own vehicle position by the scale modification, that is, the same coordinate transform as the coordinate transform from the camera position Ct to C't illustrated in FIG. 5 is performed to modify the position.

The environment map updating unit 39 updates the environment map database 5 in asynchronization with the main process step using the image, the feature point group, and the own vehicle position information at the time of imaging which are stored in the environment map database 5 in association with one another. Preferably, a bundle adjustment (for example, a technique discussed in G. Klein and D. Murray "Parallel Tracking and Mapping for Small AR Workspaces", ISMAR 2007) which is a well-known technique is used as the update technique. As a result, the feature point having no consistency is deleted from a plurality of images at the same time as correction of the position of the feature point group.

Next, a process procedure of the environment map generation apparatus 300 will be described. The process procedure according to the third embodiment differs from the flowchart of FIG. 4 in that the scale modification process of step S12 illustrated in the flowchart of FIG. 4 described in the first embodiment is executed by another thread in asynchronization with another process step. Thus, a description thereof will not be made.

As described above, in the environment map generation apparatus 300 according to the third embodiment, the environment map updating unit 39 not only update the feature point group in the environment map with acquisition of a new image but also performs correction of the position or deletion when there is no consistency on the feature point group in the environment map in an asynchronous manner, and thus the feature point having high reliability can be left. Further, the distance calculation feature point is subjected to the scale modification not when the feature point is detected but when left after an update is performed multiple times, and thus the feature point having high reliability can be used for the scale modification, and the accuracy reliability of the environment map can be improved.

[Description of Fourth Embodiment]

Figure 9:
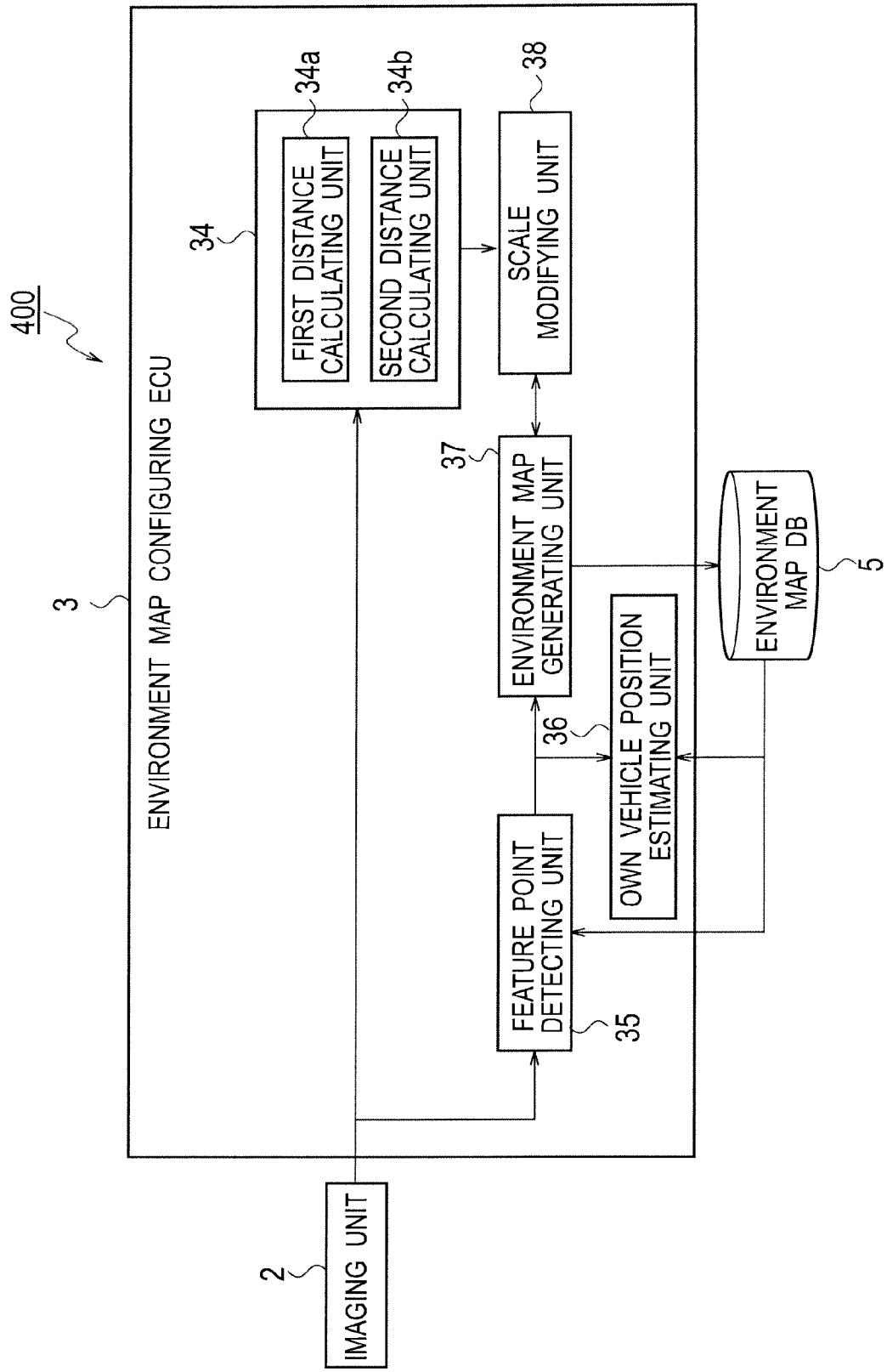
FIG. 9 is a block diagram illustrating a configuration of an environment map generation apparatus 400 according to a fourth embodiment.

Next, a fourth embodiment of the present invention will be described. FIG. 9 is a block diagram illustrating a configuration of an environment map generation apparatus 400 according to the fourth embodiment.

The environment map generation apparatus 400 illustrated in FIG. 9 differs from that of FIG. 3 described in the first embodiment in that an imaging unit 2 is different, and the projection control unit 31, the detecting unit 32, the edge detecting unit 33, and the projecting unit 4 are not provided. The remaining components are the same as in FIG. 3. Thus, the same components are denoted by the same reference numerals, and a description thereof will not be made.

The imaging unit 2 is a so-called stereocamera configured with two cameras (a camera A and a camera B) whose position relation is already known and fixed, and installed at the back side of a rearview mirror in a vehicle 1 to image an object in front of a vehicle, for example. The imaging unit 2 causes the two cameras to be synchronized with each other and performs imaging, and outputs the imaged image to the environment map configuring ECU 3. The distance calculating unit 34 calculates the distance using two images from the camera A and the camera B, but a feature point detecting unit 35, an own vehicle position estimating unit 36, an environment map generating unit 37 use any one image imaged by either the camera A or the camera B.

The distance calculating unit 34 includes a first distance calculating unit 34a and a second distance calculating unit 34b. The second distance calculating unit 34b compares the image from the camera A with the image from the camera B, and detects a corresponding pixel between the images. Further, a distance (which is referred to as a "second distance") is calculated on each of associated pixels based on a position relation between the cameras using the principle of triangulation between the corresponding pixels. Preferably, a general stereoscopy technique is used as the calculation method.

Here, in the general stereoscopy technique, distance calculation is performed in the whole screen, and thus a pixel in which a distance is erroneously calculated may occur when pixel association between images is erroneously performed. In the fourth embodiment, preference is given to accurate distance calculation having an error over distance calculation in the whole screen. In this regard, in order to suppress erroneous distance calculation by erroneous pixel association between images, it is desirable to set a threshold value used to perform image association more strictly than in the general stereoscopy technique.

In addition, the first distance calculating unit 34a calculates a distance (which is referred to as a "first distance") of the own vehicle position estimated by the own vehicle position estimating unit 36 from the installation position of the imaging unit 2 to a plurality of feature points based on the image from the camera A.

Figure 10:
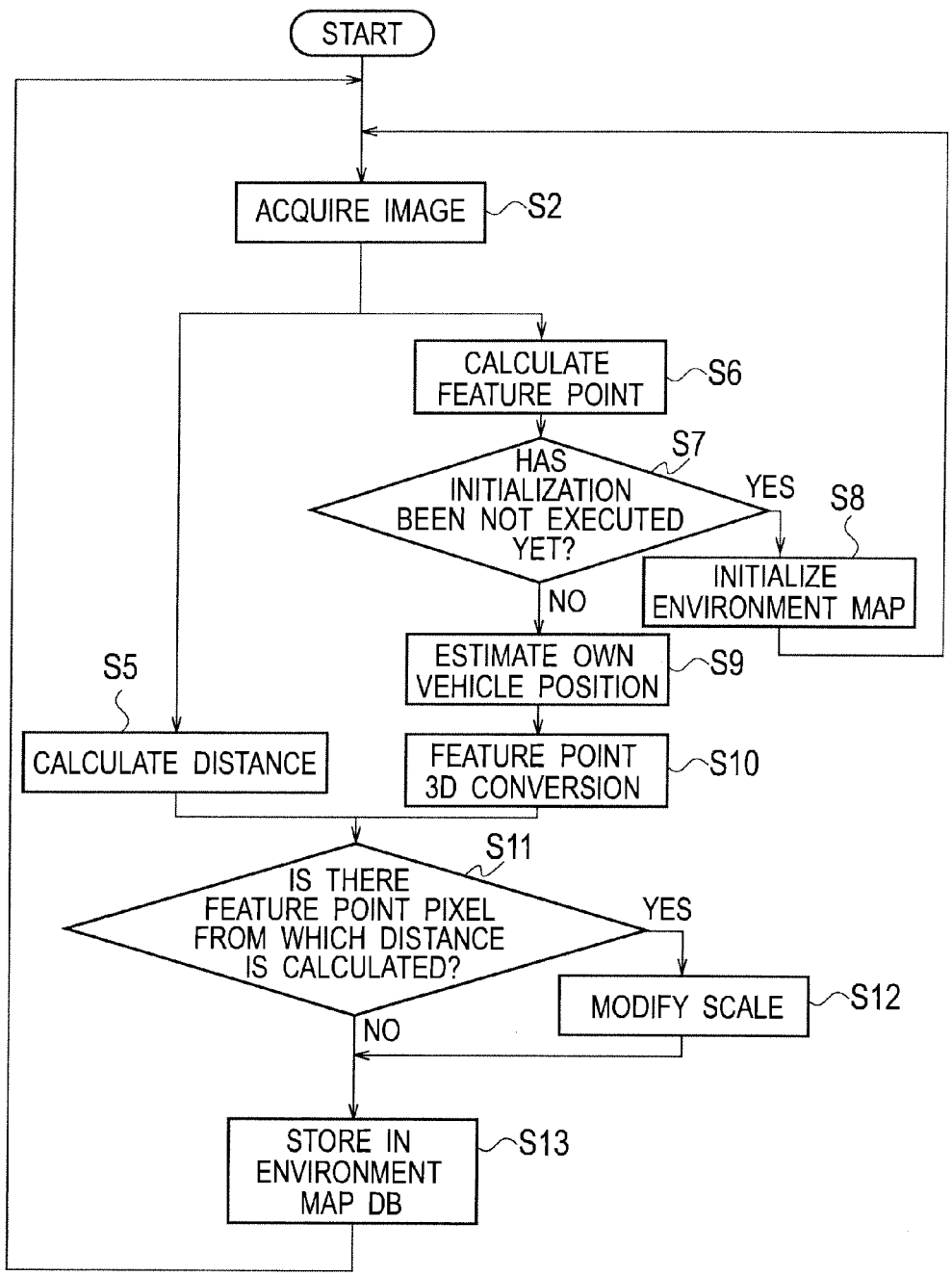
FIG. 10 is a flowchart illustrating a procedure of an environment map generating process of the environment map generation apparatus 400 according to the fourth embodiment.

Next, an environment map generating procedure by the environment map generation apparatus 400 according to the fourth embodiment will be described with reference to a flowchart illustrated in FIG. 10. The environment map generating procedure by the environment map generation apparatus 400 differs from the flowchart of FIG. 4 in that steps S1, S3, and S4 are not performed, and a processing content of step S5 is different. The remaining process is the same as in the flowchart of FIG. 4. The processing content of step S5 will be described.

In step S5, the distance calculated by the second distance calculating unit 34b of the distance calculating unit 34 is used as the second distance. Thereafter, the process proceeds to step S11.

As described above, in the environment map generation apparatus 400 according to the fourth embodiment, the position of the feature point group by motion stereo using a monocular camera is modified using the feature point from which the distance can be calculated with a high degree of accuracy even though the calculation range is reduced by the stereocamera. Thus, particularly, the accuracy of the environment map for a distant place which is hardly covered by a stereocamera can be improved.

[Description of Fifth Embodiment]

Figure 11:
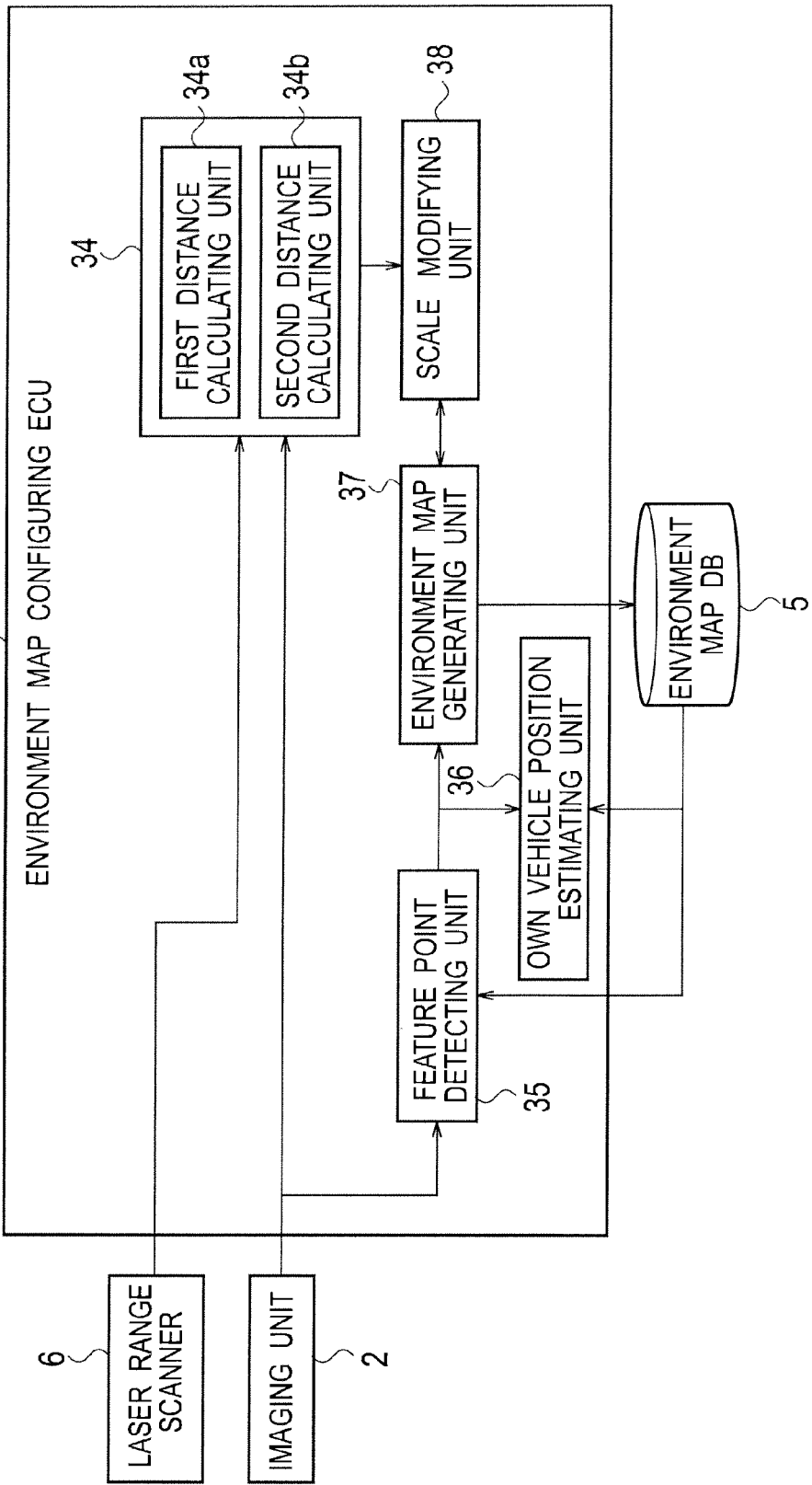
FIG. 11 is a block diagram illustrating a configuration of an environment map generation apparatus 500 according to a fifth embodiment.

Next, a fifth embodiment of the present invention will be described. FIG. 11 is a block diagram illustrating a configuration of an environment map generation apparatus 500 according to the fifth embodiment.

The environment map generation apparatus 500 illustrated in FIG. 11 differs from that illustrated in FIG. 3 described in the first embodiment in that a laser range scanner 6 is added, and the projection control unit 31, the detecting unit 32, the edge detecting unit 33, and the projecting unit 4 are not provided. The remaining components are the same as in FIG. 3. Thus, the same components are denoted by the same reference numerals, and a description thereof will not be made.

The laser range scanner 6 is a device that includes a light source and a light receiving unit and measures a distance from the laser range scanner 6 to an object by a time of flight scheme by measuring a time until light emitted from the light source is reflected from an object and reaches the light receiving unit, and is also called a lager range finder. Generally, the laser range scanner 6 can measure a distance in the form of a line. In the vehicle 1, a position relation between the imaging unit 2 and the laser range scanner 6 is already known.

A distance calculating unit 34 includes a first distance calculating unit 34a and a second distance calculating unit 34b. The second distance calculating unit 34b causes distance data calculated by the laser range scanner 6 to overlap the image by performing coordinate transform using a geometric position relation with the imaging unit 2, and calculates a distance (which is referred to as a "second distance") on each pixel that the distance data overlaps.

Further, the first distance calculating unit 34a calculates a distance (which is referred to as a "first distance") of the own vehicle position estimated by the own vehicle position estimating unit 36 from the installation position of the imaging unit 2 to a plurality of feature points.

Next, an environment map generating procedure by the environment map generation apparatus 500 according to the fifth embodiment will be described. The environment map generating procedure by the environment map generation apparatus 500 differs from the flowchart of FIG. 4 in the processing content of step S2. The remaining process is the same as in the flowchart of FIG. 4. In step S2, the laser range scanner 6 measures the distance at the same time as image acquisition.

As described above, in the environment map generation apparatus 500 according to the fifth embodiment, the distance information acquired by the laser range scanner 6 is image-converted to the image imaged by the imaging unit 2, and thus the accurate distance information is added on the feature point group by motion stereo using the monocular camera.

[Description of Sixth Embodiment]

Figure 12:
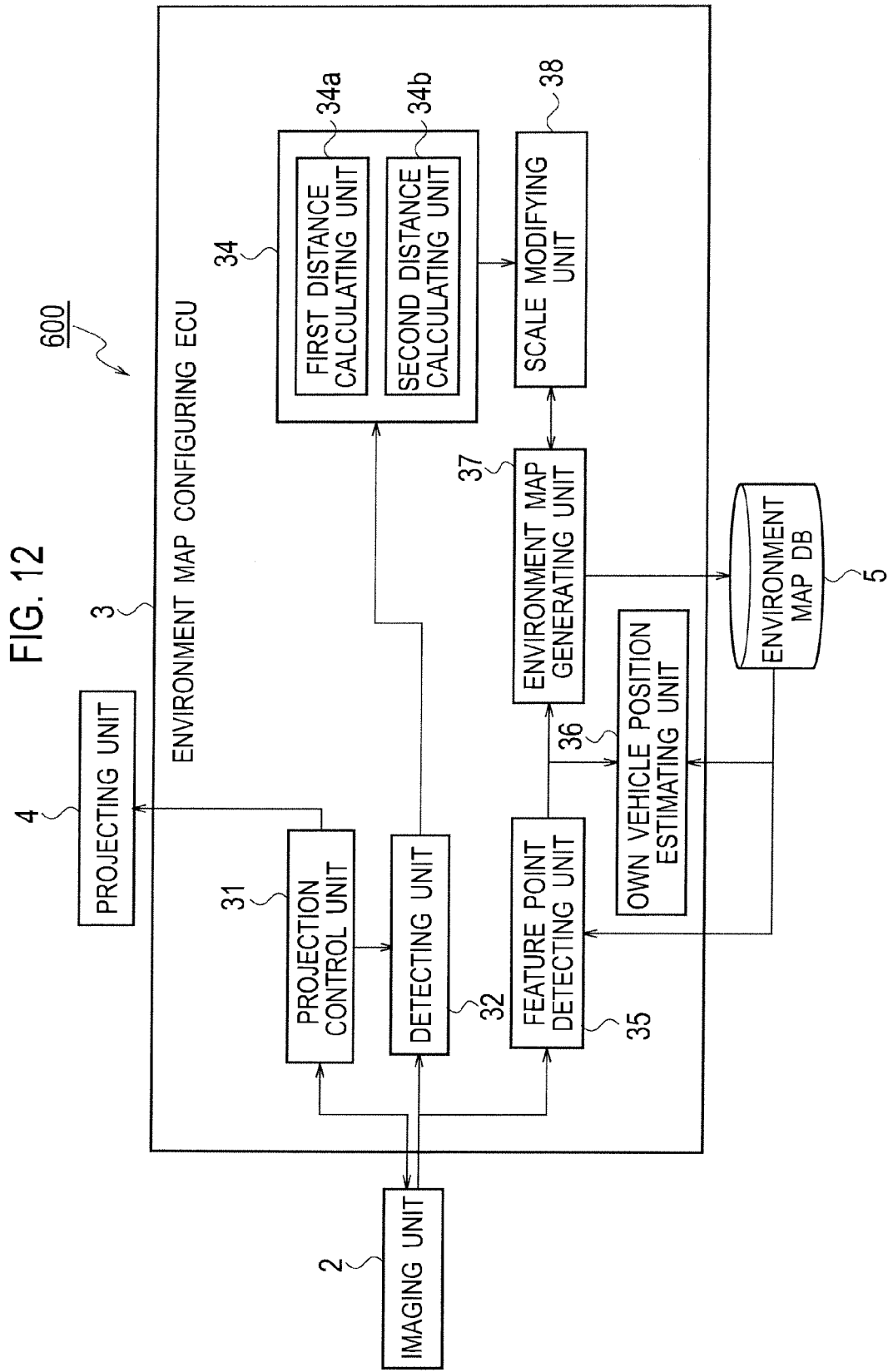
FIG. 12 is a block diagram illustrating a configuration of an environment map generation apparatus 600 according to a sixth embodiment.

Next, a sixth embodiment of the present invention will be described. FIG. 12 is a block diagram illustrating a configuration of an environment map generation apparatus 600 according to the sixth embodiment.

The environment map generation apparatus 600 illustrated in FIG. 12 differs from that illustrated in FIG. 3 described in the first embodiment in that processing contents of a projecting unit 4, a projection control unit 31, and a detecting unit 32 are different, and the edge detecting unit 33 is not provided. The remaining components are the same as in FIG. 3. Thus, the same components are denoted by the same reference numerals, and a description thereof will not be made.

For example, the projecting unit 4 is a laser light source or an infrared light source, and a means capable of projecting pattern light. Light emitted from the projecting unit 4 is irradiated to a measurement target object, separated from natural light by the imaging unit 2, and has light having a detectable wavelength. For example, the pattern light may be obtained by projecting a laser in the form of a line or by projecting infrared light of a dot pattern to be employed by Kinect.

The projection control unit 31 controls the length of the lighting-on time and the length of the lighting-off time of the projecting unit 4. Further, the projection control unit 31 outputs an imaging timing signal to the imaging unit 2.

The detecting unit 32 extracts only light having a wavelength of the pattern light irradiated by the projecting unit 4 in all pixels of an image using an image imaged by the imaging unit 2. Preferably, a commonly used well-known pattern light detecting technique is used in a process of robustly detecting only irradiation light.

A distance calculating unit 34 includes a first distance calculating unit 34a and a second distance calculating unit 34b. The second distance calculating unit 34b calculates a distance (which is referred to as a "second distance") on each pixel on the pattern light detected and specified by the detecting unit 32 based on an irradiation direction of the irradiation pattern light, an angle formed by a visual axis of the imaging unit 2, and the layout using the principle of triangulation. Preferably, when the pattern light has the form of a line, a technique generally called the optical-cutting technique is used as a calculating technique. Preferably, when the pattern light has a dot pattern, a processing technique (US Patent Publication No. 2010/0118123A1) used in the Kinect is used.

Further, the first distance calculating unit 34a calculates a distance (which is referred to as a "first distance") of the own vehicle position estimated by the own vehicle position estimating unit 36 from the installation position of the imaging unit 2 to a plurality of feature points.

Next, an environment map generating procedure by the environment map generation apparatus 600 according to the sixth embodiment will be described. The environment map generating procedure by the environment map generation apparatus 600 differs from the flowchart of FIG. 4 in that the edge portion detecting process of step S4 is not performed. The remaining process is the same as in the flowchart of FIG. 4.

As described above, in the environment map generation apparatus 600 according to the sixth embodiment, light having a wavelength separatable from natural light such as infrared light or laser light is used as projection light, and thus synchronous detection from consecutive images which is necessary in the first embodiment is unnecessary.

The exemplary embodiment of the present invention have been described, but the present invention is not limited to the above embodiment, and it will be understood by those skilled in the art that various modifications and improvement can be made.

The first to sixth embodiments have been described in connection with the environment map generation apparatus which is mounted in the vehicle, performs 3D conversion on a plurality of feature points based on the first distance calculated by the first distance calculating unit and generates the environment map around the traveling road. But the embodiment of the present invention is not limited to the environment map generation apparatus. For example, the present invention may be implemented as a distance measurement device that modifies distances to the feature points FP on a plurality of objects OB1 and OB2 present around the vehicle 1 based on the ratio of the first distance and the second distance, and improves the accuracy of distance measurement.

A distance measurement device according to another embodiment includes a imaging unit 2, a feature point detecting unit 35, a first distance calculating unit 34a, a second distance calculating unit 34b, and a scale modifying unit 38. The imaging unit 2 images an image around the vehicle 1 while the vehicle 1 is moving. The feature point detecting unit 35 detects feature points FP of a plurality of objects OB1 and OB2 present around the vehicle 1 from the image imaged by the imaging unit 2. The first distance calculating unit 34a calculates a first distance from the feature point FP to the imaging unit 2 based on a temporal change of the feature point detected by the feature point detecting unit 35. The second distance calculating unit 34b calculates a second distance from a certain object included in the plurality of objects OB1 and OB2 present in the image to the imaging unit 2 using some pixels of the certain object. The scale modifying unit 38 extracts a certain feature point substantially matching some pixels of the certain object from among the feature points of the plurality of objects, calculates a ratio of the first distance and the second distance in the certain feature point, and modifies the first distance of the plurality of feature points, other than the certain feature point, simultaneously detected by the feature point detecting unit 35 based on the ratio of the first distance and the second distance.

The distance measurement device according to another embodiment may further include a projecting unit 4 that projects light having an edge portion ED extending in the horizontal direction and an edge detecting unit 33 that detects the edge portion ED of the light. In this case, the second distance calculating unit 34b calculates the second distance between the edge portion ED in the certain object and the imaging unit 2.

The environment map generation apparatuses described in the first to sixth embodiments can be implemented using the distance measurement device.

The entire content of Japanese Patent Application JP 2011-131888 filed in the Japan Patent Office on Jun. 14, 2011 is hereby incorporated by reference.

Industrial Applicability

In the distance measurement device and the environment map generation apparatus according to the embodiments of the present invention, the first distance which is the distance between the feature point in the image detected by the feature point detecting unit 35 and the imaging unit 2 is calculated. When there is a feature point from which the second distance can be calculated by the distance calculating unit 34, the scale of 3D positions of plurality of feature points which have been subjected to 3D conversion is modified based on the scale ration which is the ratio of the first distance and the second distance. As a result, the environment map having the highly accurate scale accuracy can be generated as a whole. Particularly, the accuracy improvement effect is high in the distant feature point for a distant place which is hardly corrected by the related art. Thus, the distance measurement device and the environment map generation apparatus according to the embodiments of the present invention is industrially applicable.

REFERENCE SIGNS LIST

1: vehicle
2: imaging unit
3: environment map configuring ECU
4: projecting unit
5: environment map database
6: laser range scanner
31: projection control unit
32: detecting unit
33: edge detecting unit
34: distance calculating unit
34a: first distance calculating unit
34b: second distance calculating unit
35: feature point detecting unit
36: own vehicle position estimating unit
37: environment map generating unit
38: scale modifying unit
39: environment map updating unit
100, 200, 300, 400, 500: environment map generation apparatus

The invention claimed is:

1. A distance measurement device, comprising:
an imaging unit configured to image an image around a vehicle while the vehicle is moving;
a feature point detecting unit configured to detect feature points of a plurality of objects present around the vehicle from the image imaged by the imaging unit;
a first distance calculating unit configured to calculate a first distance from a feature point to the imaging unit based on a temporal change of the feature point detected by the feature point detecting unit;
a second distance calculating unit configured to calculate a second distance from a certain object included in the plurality of objects present in the image to the imaging unit using some pixels of the certain object; and
a scale modifying unit configured to extract a certain feature point matching some pixels of the certain object from among the feature points of the plurality of objects, calculate a ratio of the first distance and the second distance in the certain feature point, and modify the first distance of the feature points, other than the certain feature point, simultaneously detected by the feature point detecting unit based on the ratio.

2. The distance measurement device according to claim 1, further comprising:
a projecting unit configured to project light having an edge portion extending in a horizontal direction; and
an edge detecting unit configured to detect the edge portion of the light,
wherein the second distance calculating unit calculates the second distance between the edge portion in the certain object and the imaging unit.

3. An environment map generation apparatus that is mounted in a vehicle and generates an environment map around a traveling road, comprising:
an imaging unit configured to image an image around a vehicle;
a feature point detecting unit configured to detect a plurality of feature points from the image imaged by the imaging unit;
an own vehicle position estimating unit configured to estimate an own vehicle position including an installation position of the imaging unit from a plurality of consecutively arranged feature points detected by the feature point detecting unit;
a first distance calculating unit configured to calculate a first distance of the own vehicle position estimated by the own vehicle position estimating unit from the installation position of the imaging unit to the plurality of feature points;
an environment map generating unit configured to perform 3D conversion on the plurality of feature points detected by the feature point detecting unit based on the first distance calculated by the first distance calculating unit, and generate an environment map;
a projecting unit configured to project pulsed light having a light-emitting region in a horizontal direction;
a detecting unit configured to extract the pulsed light from the image imaged by the imaging unit by synchronous detection;
an edge detecting unit configured to detect an edge portion of an upper end of the pulsed light detected by the detecting unit; and
a second distance calculating unit configured to calculate a second distance between the edge portion detected by the edge detecting unit and the imaging unit,
wherein the environment map generating unit determines whether or not image positions of the plurality of feature points match an image position of the edge portion; and
the environment map generation apparatus further comprises a scale modifying unit configured to use a feature point determined as being matched as a certain feature point, calculate a scale ratio which is a ratio of the first distance and the second distance of the certain feature point, and modify the first distance of the plurality of feature points, other than the certain feature point, simultaneously detected by the feature point detecting unit based on the scale ratio.

4. The environment map generation apparatus according to claim 3,
wherein the feature point detecting unit determines whether or not a feature point is a certain feature point based on a feature point detection threshold value, and
the feature point detecting unit causes a region near the edge portion in which the second distance calculating unit calculates a distance to be lower in the feature point detection threshold value than other regions so that a feature point is easily detected in the region near the edge portion.

5. The environment map generation apparatus according to claim 4,
wherein the feature point detecting unit sets a region having a predetermined width above and below the edge portion as the region near the edge portion.

6. The environment map generation apparatus according to claim 3,
wherein the scale modifying unit obtains each feature point intensity for each of the plurality of feature points, obtains a weighted average value of the scale ratio according to each feature point intensity, and modifies a 3D position of a plurality of feature points other than the certain feature point based on the weighted average value.

7. The environment map generation apparatus according to claim 3,
wherein the imaging unit images a plurality of images in time series,
the environment map generation apparatus further comprises a map updating unit configured to update the environment map using the images imaged in time series, and
when the certain feature point has not been deleted by the map updating unit until a predetermined period of time elapses, the scale modifying unit modifies a 3D position of the other plurality of feature points detected at the same time as the feature point based on the scale ratio.

* * * * *